(12) United States Patent
Murashima

(10) Patent No.: US 7,728,741 B2
(45) Date of Patent: Jun. 1, 2010

(54) CODE CONVERSION DEVICE, CODE CONVERSION METHOD USED FOR THE SAME AND PROGRAM THEREOF

(75) Inventor: Atsushi Murashima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/158,220

(22) PCT Filed: Dec. 19, 2006

(86) PCT No.: PCT/JP2006/325275

§ 371 (c)(1),
(2), (4) Date: Jun. 19, 2008

(87) PCT Pub. No.: WO2007/072819

PCT Pub. Date: Jun. 28, 2007

(65) Prior Publication Data

US 2009/0174582 A1    Jul. 9, 2009

(30) Foreign Application Priority Data

Dec. 21, 2005   (JP) .............................. 2005-367308

(51) Int. Cl.
    *H03M 5/00*   (2006.01)
(52) U.S. Cl. ..................... 341/55; 341/94; 704/226; 704/228
(58) Field of Classification Search ................ 341/55, 341/94; 704/226, 228, 229
    See application file for complete search history.

(56) References Cited

U.S. PATENT DOCUMENTS 5,928,379 A * 7/1999 Hattori ....................... 714/807
6,055,497 A * 4/2000 Hallkvist et al. ............ 704/228
6,144,936 A * 11/2000 Jarvinen et al. ............. 704/226

(Continued)

FOREIGN PATENT DOCUMENTS

EP          0459358 A       12/1991

(Continued)

OTHER PUBLICATIONS

M.R. Schroeder and B.S. Atal, "Code-Exited Linear Prediction (CELP); High Quality Speech at Very Low Bit Rates", Proc. of IEEE Int. Conf. on Acoust., Speech and Signal Processing, pp. 937-940, (1985).

(Continued)

*Primary Examiner*—Khai M Nguyen

(57) ABSTRACT

Provided is a code conversion device that is capable of converting codes even if an input code sequence is invalid, and is able to reduce the amount of processing. When a first code sequence is input, the code conversion device generates a decoded signal by decoding the codes of normal frames of the first code sequence at Step S1, stores and holds the decoded signal at Step S2, generates a signal corresponding to an invalid frame by interpolation with the decoded signal that is stored and held, at Step S3. Subsequently, the code conversion device generates codes corresponding to the invalid frame by encoding the generated signal at Step S4, and makes the normal frames of the first code sequence without conversion be the frames of the second code sequence while making the generated codes be the frame of the second code sequence, in place of the codes of the invalid frame, at Step S5.

9 Claims, 9 Drawing Sheets

U.S. PATENT DOCUMENTS

| | | | |
|---|---|---|---|
| 6,205,130 B1 * | 3/2001 | DeJaco | 370/335 |
| 6,985,856 B2 * | 1/2006 | Wang et al. | 704/226 |
| 2004/0128128 A1 | 7/2004 | Wang et al. | |

FOREIGN PATENT DOCUMENTS

| | | | |
|---|---|---|---|
| EP | 0707308 | A | 4/1996 |
| JP | 05199124 | A | 8/1993 |
| JP | 06014294 | A | 1/1994 |
| JP | 06311052 | A | 11/1994 |
| JP | 07087001 | A | 3/1995 |
| JP | 08166800 | A | 6/1996 |
| JP | 09101800 | A | 4/1997 |
| JP | 09261185 | A | 10/1997 |
| JP | 10022938 | A | 1/1998 |
| JP | 3070057 | B2 | 5/2000 |
| JP | 2002202799 | A | 7/2002 |
| JP | 2002237857 | A | 8/2002 |

OTHER PUBLICATIONS

"Mandatory Speech Codec Speech Processing Functions, AMR Speech Codec; Transcoding Functions", 3rd Generation Partnership Project; Technical Specification Group Services and System Aspects, 3G TS 26.090 V3.1.0 (Dec. 1999), 3GPP Organizational Partners, pp. 1-61.

"Pulse Code Modulation (PCM) of Voice Frequencies" ITU Recommendation G.711, International Telecommunication Union, (1993) pp. 1-10.

Gary Sullivan, "Draft Text of Recommendation H.263 Version 2 ("H.263+") for Decision", Study Group 16—Contribution to COM-999, International Telecommunication Union, Telecommunication Standardization Sector, Study Period 1997-2000, (Sep. 2, 1998),. pp. 1-52.

"Mandatory Speech Codec Speech Processing Functions, AMR Speech Codec Frame Structure", 3rd Generation Partnership Project; Technical Specification Group Services and System Aspects, 3GPP TS 26.101 V3.3.0 (Mar. 2002), 3GPP Organizational Partners, pp. 1-19.

International Search Report for PCT/JP2006/325275 mailed Apr. 3, 2007.

Supplementary European Search Report for EP 06 84 2879 completed Mar. 30, 2009.

International Preliminary Report on Patentability with Written Opinion for PCT/JP2006/325275 mailed Jul. 3, 2008.

* cited by examiner

CODE CONVERSION DEVICE, CODE CONVERSION METHOD USED FOR THE SAME AND PROGRAM THEREOF

TECHNICAL FIELD

The present invention relates to a code conversion device, code conversion method used for the same and program thereof, in particular relating to an encoding and decoding method for transmitting or storing a signal such as speech and the like at a low-bit rate, or a code conversion method for converting codes that have been obtained by encoding a signal based on a certain scheme, with high speech quality and by a low amount of processing.

To simplify the description hereinbelow, a specific example of a signal is presumed to be a speech signal. As a method of encoding a speech signal at a middle or low bit rate with high efficiency, there is a widely used method whereby encoding is carried out by separating the speech signal into an LP (Linear Prediction) filter and an excitation signal for driving it.

CELP (Coded Excited Linear Prediction) is one representative method of this (for example, see a non-patented document 1 ['M. R. Schroeder and B. S. Atal, "Code excited linear prediction; High quality speech at very low bit rates" (Proc. Of IEEE Int. Conf. on Acoust., Speech and Signal Processing, pp. 937-940, 1985)]). In CELP, an LP filter set up with LP coefficients that represent frequency characteristics of an input speech signal is driven by an excitation signal that is represented as a sum of ACB (Adaptive Codebook) that represent the pitch period of the input speech signal and FCB (Fixed Codebook) made up of random numbers and pulses so as to obtain a synthesized speech signal. In this case, the ACB component and the FCB component are multiplied by respective gains (ACB gain and FCB gain).

Conversion of the codes that are obtained by encoding the speech signal based on the above scheme enables communications between different systems and change of the code transmission rate before and after the conversion. Hereinbelow, a conventional code converting scheme will be described.

FIG. 1 is a diagram showing one example of a configuration of a conventional code conversion device based on tandem connection. Referring to FIG. 1, a conventional code conversion device will be described. Here, it is assumed that a code sequence is input and output at every frame period (e.g., with a period of 20 msec) as the processing unit of encoding and decoding.

Code sequence converting circuit 100 includes decoding circuit 130 and encoding circuit 141. Decoding circuit 130 decodes a speech signal from the first code sequence input through input terminal 10, based on a decoding method, and outputs a speech signal which has been decoded, i.e., a decoded speech to encoding circuit 140.

Encoding circuit 141 receives the decoded speech signal output from decoding circuit 130, encodes the decoded speech signal based on an encoding method and outputs the obtained encoded sequence as the second code sequence, from output terminal 20. Here, as to the aforementioned speech encoding method and decoding method, other than that described in non-patented document 1, some methods have been described in non-patented document 2 ["AMR Speech Codec: Transcoding functions"[3GPP (3rd Generation Partnership Project) TS26.090]], non-patented document 3 {"Pulse Code Modulation (PCM) of Voice Frequencies" [ITU-T (International Telecommunication Union-Telecommunication Standardization Sector) Recommendation G.711] and the like.

DISCLOSURE OF INVENTION

However, in the above-described conventional code conversion device, the input first code sequence is once decoded in the decoding circuit, then the speech signal obtained by this decoding is encoded once again in the encoding circuit. Accordingly, there occurs the problem that code conversion cannot be carried out when the first code sequence is invalid such as in the case where there are errors in the codes contained in the first code sequence, in the case where there is a code lack or other cases. Further, the conventional code conversion device also has the problem that a large amount of processing is needed for code conversion.

It is therefore an object of the invention to provide a code conversion device, code conversion method used for the same and program thereof, which can solve the above problems and can perform code conversion even if an input code sequence is invalid and which can reduce the amount of processing.

A code conversion device according to the present invention is a code conversion device for converting a first code sequence into a second code sequence, and includes: a decoding circuit for generating a decoded signal by decoding the codes of normal frames of said first code sequence; a storing circuit for storing and holding the generated decoded signal; an interpolating circuit for generating a signal corresponding to an invalid frame regarded as an undecodable frame, by interpolation with the decoded signal stored and held in said storing circuit; an encoding circuit for generating codes corresponding to said invalid frame by encoding the generated signal; and a switching device for making said normal frames of said first code sequence without conversion be the second code sequence while making the codes generated by said encoding circuit be the second code sequence, in place of the codes of said invalid frame.

Another code conversion device according to the present invention is a code conversion device for converting a first code sequence into a second code sequence, and includes: a storing circuit for storing and holding normal frames of said first code sequence; an interpolating circuit for generating a frame that replaces an invalid frame regarded as an undecodable frame, by interpolation with said normal frames stored and held in said storing circuit; a decoding circuit for generating a decoded signal by decoding the codes of the generated frame; an encoding circuit for generating codes corresponding to said invalid frame by encoding the decoded signal generated by said decoding circuit; and a switching device for making said normal frames of said first code sequence without conversion be the frame of the second code sequence while making the codes generated by said encoding circuit be the second code sequence, in place of the codes of said invalid frame.

Another code conversion device according to the present invention is a code conversion device for converting a first code sequence into a second code sequence, and includes: a decoding circuit for decoding the codes of normal frames of said first code sequence to acquire encoding parameters and generating a decoded signal based on the encoding parameters generated by interpolation; a storing circuit for storing and holding the encoding parameters acquired by said decoding circuit; an interpolating circuit for generating encoding parameters corresponding to an invalid frame regarded as an undecodable frame, by interpolation with said encoding parameters stored and held in said storing circuit; an encoding circuit for generating codes corresponding to said invalid frame by encoding the decoded signal generated by said decoding circuit; and a switching device for making said normal frames of said first code sequence without conversion be the second code sequence while making the codes generated by said encoding circuit be the second code sequence, in place of the codes of said invalid frame.

A code conversion method according to the present invention is a code conversion method for use in a code conversion device for converting a first code sequence into a second code sequence, and said code conversion device executes: a first process of generating a decoded signal by decoding the codes of normal frames of said first code sequence; a second process of storing and holding said decoded signal; a third process of generating a signal corresponding to an invalid frame regarded as an undecodable frame, by interpolation with said decoded signal that is stored and held; a fourth process of generating codes corresponding to said invalid frame by encoding the signal generated in the third process; and a fifth process of making said normal frames of said first code sequence without conversion be the second code sequence while making the codes generated in the fourth process be the second code sequence, in place of the codes of said invalid frame.

Another code conversion method according to the present invention is a code conversion method for use in a code conversion device for converting a first code sequence into a second code sequence, and said code conversion device executes: a first process of storing and holding normal frames of said first code sequence; a second process of generating a frame that replaces an invalid frame regarded as an undecodable frame, by interpolation with said normal frames that are stored and held; and a third process of generating a decoded signal by decoding the codes of the frame generated in the second process; a fourth process of generating codes corresponding to said invalid frame by encoding the signal generated in said fourth process; and a fifth process of making said normal frames of said first code sequence without conversion be the second code sequence while making the codes generated in the fourth process be the second code sequence, in place of the codes of said invalid frame.

Another code conversion method according to the present invention is a code conversion method for use in a code conversion device for converting a first code sequence into a second code sequence, and said code conversion device executes: a first process of decoding the codes of normal frames of said first code sequence to acquire encoding parameters; a second process of storing and holding the acquired encoding parameters; a third process of generating encoding parameters corresponding to an invalid frame regarded as an undecodable frame, by interpolation with said encoding parameters that are stored and held; a fourth process of generating a decoded signal based on the encoding parameters generated by interpolation; a fifth process of generating codes corresponding to said invalid frame by encoding the generated decoded signal; and a sixth process of making said normal frames of said first code sequence without conversion be the frames of the second code sequence while making the codes generated in said fifth process be the frame of the second code sequence, in place of the codes of said invalid frame.

A program for a code conversion method according to the present invention is a program for a code conversion method for use in a code conversion device for converting a first code sequence into a second code sequence, and causes a computer to execute: a first process of generating a decoded signal by decoding the codes of normal frames of said first code sequence; a second process of storing and holding said decoded signal; a third process of generating signal corresponding to an invalid frame regarded as an undecodable frame, by interpolation with said decoded signal stored and held in said storing circuit; a fourth process of generating codes corresponding to said invalid frame by encoding the generated signal in the third process; and a fifth process of making said normal frames of said first code sequence without conversion be the second code sequence while making the codes generated in the fourth process be the second code sequence, in place of the codes of said invalid frame.

Another program for a code conversion method according to the present invention is a program for a code conversion method for use in a code conversion device for converting a first code sequence into a second code sequence, and causes a computer to execute: a first process of storing and holding normal frames of said first code sequence; a second process of generating a frame that replaces an invalid frame regarded as an undecodable frame, by interpolation with said normal frames that are stored and held; a third process of generating a decoded signal by decoding the codes of the frame generated in the second process; a fourth process of generating codes corresponding to said invalid frame by encoding the signal generated in said third process; and a fifth process of making said normal frames of said first code sequence without conversion be the second code sequence while making the codes generated in the fourth process be the second code sequence, in place of the codes of said invalid frame.

Another program for a code conversion method according to the present invention is a program for a code conversion method for use in a code conversion device for converting a first code sequence into a second code sequence, and causes a computer to execute: a first process of decoding the codes of normal frames of said first code sequence to acquire encoding parameters; a second process of storing and holding the acquired encoding parameters; a third process of generating encoding parameters corresponding to an invalid frame regarded as an undecodable frame, by interpolation with said encoding parameters that are stored and held; a fourth process of generating a decoded signal based on the encoding parameters generated by interpolation; a fifth process of generating codes corresponding to said invalid frame by encoding the generated decoded signal; and a sixth process of making said normal frames of said first code sequence without conversion be the frames of the second code sequence while making the codes generated in said fifth process be the frame of the second code sequence, in place of the codes of said invalid frame.

That is, in order to solve the above problems, a code conversion method of the present invention is used in a code conversion device for converting a first code sequence into a second code sequence, and comprises the steps of: generating a decoded signal by decoding the codes of normal frames of the first code sequence; storing and holding the decoded signal; generating a signal corresponding to an invalid frame regarded as an undecodable frame, by interpolation with the decoded signal that is stored and held; generating codes corresponding to the invalid frame by encoding the generated signal; and making the normal frames of the first code sequence without conversion be the second code sequence while making the generated codes be the second code sequence, in place of the codes of the invalid frame.

Also, another code conversion method according to the present invention is used in a code conversion device for converting a first code sequence into a second code sequence, and comprises the steps of: storing and holding normal frames of the first code sequence; generating a frame that replaces an invalid frame regarded as an undecodable frame, by interpolation with the normal frames that are stored and held; generating a decoded signal by decoding the codes of the generated frame; generating codes corresponding to the invalid frame by encoding the generated signal; and making the normal frames of the first code sequence without conversion be the second code sequence while making the generated codes be the second code sequence, in place of the codes of the invalid frame.

Further, another code conversion method according to the present invention is used in a code conversion device for converting a first code sequence into a second code sequence, and comprises the steps of: decoding the codes of normal frames of the first code sequence to acquire encoding parameters; storing and holding the acquired encoding parameters; generating encoding parameters corresponding to an invalid frame regarded as an undecodable frame, by interpolation with the encoding parameters that are stored and held; generating a decoded signal based on the encoding parameters generated by interpolation; generating codes corresponding to the invalid frame by encoding the generated decoded signal; and making the normal frames of the first code sequence without conversion be the frames of the second code sequence while making the generated codes be the frame of the second code sequence, in place of the codes of the invalid frame.

Describing more specifically, in a code conversion method of the present invention, when a first code sequence is converted into a second code sequence in a code conversion device, a decoding circuit generates a decoded signal by decoding the codes of normal frames of the first code sequence, and the decoded signal is stored and held in a storing circuit. Then, an interpolating circuit generates a signal corresponding to an invalid frame by interpolation with the decoded signal that is stored and held in the storing circuit. An encoding circuit generates codes corresponding to the invalid frame by encoding the signal generated in the interpolating circuit. A switching device makes the normal frames of the first code sequence without conversion be the second code sequence while making the generated codes be the second code sequence, in place of the codes of the invalid frame.

In this way, in a code conversion method of the present invention, for the codes of invalid frames of the first code sequence, the codes corresponding to the invalid frames are generated by interpolating with the signals obtained by decoding the normal frames and using the codes obtained by encoding the result, so as to convert the first code sequence into the second code sequence without decoding the invalid frames. Accordingly, it is possible to perform code conversion of even the invalid frames whose codes cannot be converted due to inability to decode the codes, as in the case where there are errors in the codes contained in the first code sequence, in the case where there are some codes lacking and in other cases.

Also, in another code conversion method according to the present invention, when a first code sequence is converted into a second code sequence in a code conversion device, a storing circuit stores and holds normal frames of the first code sequence, and an interpolating circuit generates a frame that replaces an invalid frame by interpolation with the normal frames that are stored and held in the storing circuit. Then, decoding circuit generates a decoded signal by decoding the codes of the frame generated in the interpolating circuit, and an encoding circuit generates codes corresponding to the invalid frame by encoding the signal generated in the decoding circuit. A switching device makes the normal frames of the first code sequence without conversion be the second code sequence while making the generated codes be the second code sequence, in place of the codes of the invalid frame.

In this way, in the other code conversion method of the present invention, codes corresponding to invalid frames are generated by interpolating with normal frames and using the codes obtained by decoding and encoding the result, so as to convert the first code sequence into the second code sequence without decoding the invalid frames. Accordingly, it is possible to perform code conversion of even the invalid frames whose codes cannot be converted due to inability to decode the codes, as in the case where there are errors in the codes contained in the first code sequence, in the case where there are some codes lacking and in other cases.

Further, in another code conversion method according to the present invention, when a first code sequence is converted into a second code sequence in a code conversion device, a decoding circuit decodes the codes of normal frames of the first code sequence to acquire encoding parameters, and stores and hold the acquired encoding parameters in a storing circuit. Then an interpolating circuit generates encoding parameters corresponding to an invalid frame by interpolation with the encoding parameters that are stored and held in the storing circuit, and a decoding circuit generates a decoded signal based on the encoding parameters generated by interpolation. An encoding circuit generates codes corresponding to the invalid frame by encoding the decoded signal generated in the decoding circuit. A switching device makes the normal frames of the first code sequence without conversion be the second code sequence while making the generated codes be the second code sequence, in place of the codes of the invalid frame.

In this way, in the other code conversion method of the present invention, codes corresponding to invalid frames are generated by interpolating with the encoding parameters obtained from normal frames and using the codes obtained by decoding and encoding this, so as to convert the first code sequence into the second code sequence without decoding the invalid frames. Accordingly, it is possible to perform code conversion of even the invalid frames whose codes cannot be converted due to inability to decode the codes, as in the case where there are errors in the codes contained in the first code sequence, in the case where there are some codes lacking and in other cases.

The construction and operation of the present invention as described above makes it possible to achieve code conversion even if an input code sequence is invalid and provides the effect of reducing the amount of processing.

Figure 1:
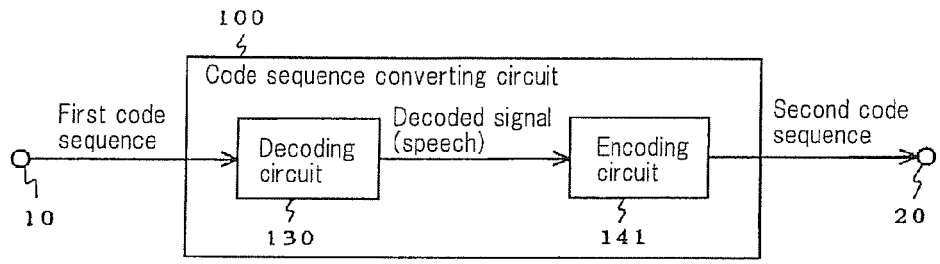
FIG. 1 is a block diagram showing a configuration of a conventional code conversion device.

DESCRIPTION OF REFERENCE NUMERALS 1 computer
2 CPU
3 memory
4 recording medium reader interface
5 recording medium reader device
6 recording medium
10, 11 input terminals
20 output terminal
110-112 Decoding circuits
120 first storing circuit
130 first interpolating circuit
140 encoding circuit
150 switching device
160 second storing circuit
170 second interpolating circuit
180 third storing circuit
190 third interpolating circuit

BEST MODE FOR CARRYING OUT THE INVENTION

Figure 2:
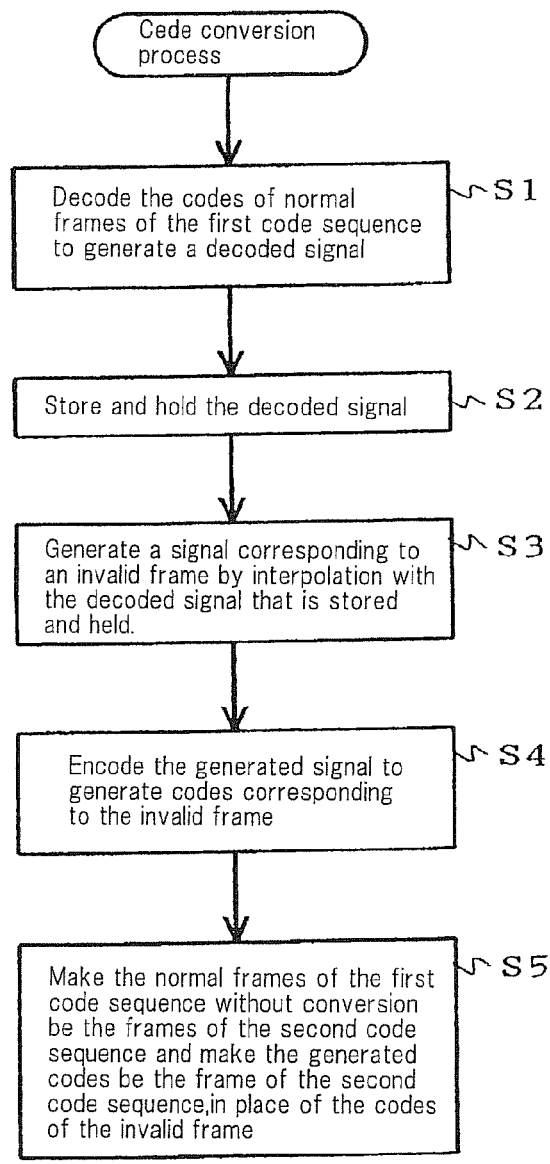
FIG. 2 is a flow chart showing a processing example of a code conversion method according to an exemplary embodiment of the present invention.

Next, the exemplary embodiment of the present invention will be described with reference to the drawings. FIG. 2 is a flow chart showing one processing example of a code conversion method of the exemplary embodiment of the present invention. Referring to FIG. 2, the process of the code conversion method according to the exemplary embodiment of the present invention will be described. Here, it is assumed that the process shown in FIG. 2 is carried out in an unillustrated code conversion device.

When the first code sequence is input to the code conversion device, the codes of the normal frames of the first code sequence are decoded to generate a decoded signal (Step S1 in FIG. 2), the decoded signal is stored and held (Step S2 in FIG. 2), and the signals corresponding to invalid frames are generated by interpolating with the decoded signal that has been stored and held (Step S3 in FIG. 2).

Subsequently, the code conversion device encodes the generated signal to generate codes corresponding to the invalid frames (Step S4 in FIG. 2), and makes the normal frames of the first code sequence be the frames of the second code sequence without performing their conversion while replacing the codes of the invalid frames with the generated codes to make the result be the frames of the second code sequence (Step S5 in FIG. 2).

Figure 3:
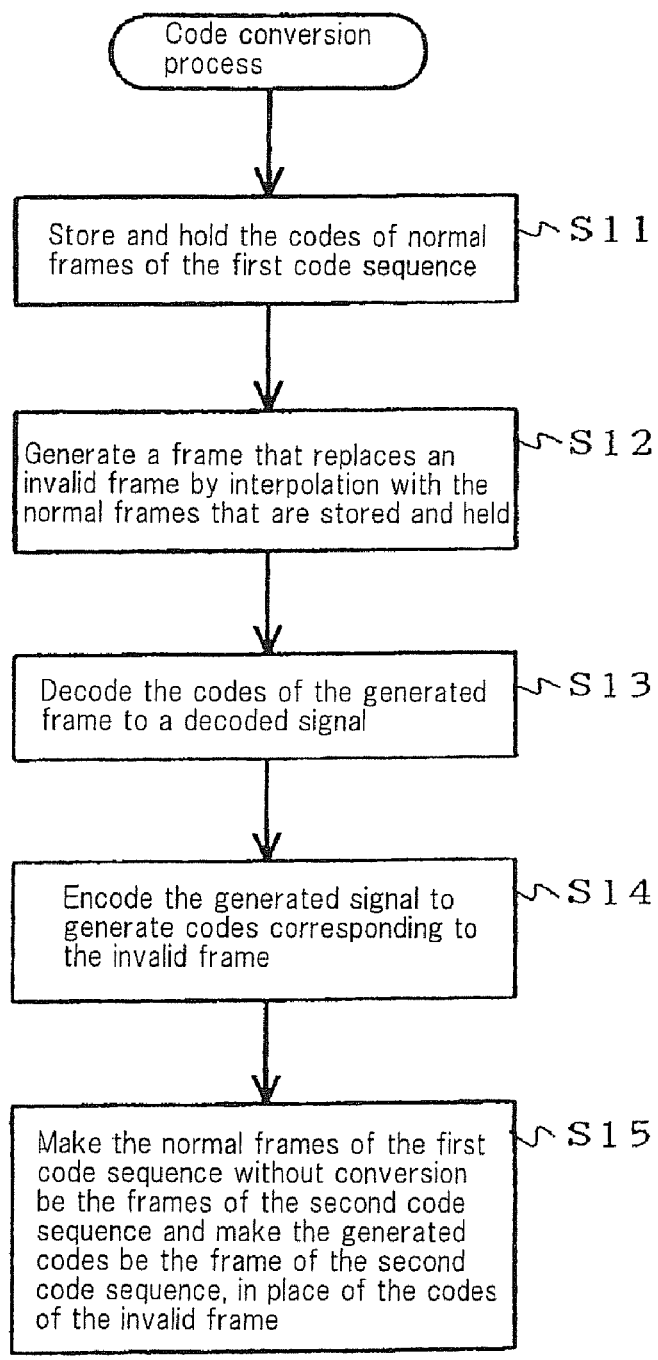
FIG. 3 is a flow chart showing another processing example of a code conversion method according to an exemplary embodiment of the present invention.

FIG. 3 is a flow chart showing another processing example of a code conversion method of an exemplary embodiment of the present invention. Referring to FIG. 3, another example of the process of the code conversion method according to the exemplary embodiment of the present invention will be described. Here, it is assumed that the process shown in FIG. 3 is also carried out in an unillustrated code conversion device.

When the first code sequence is input to the code conversion device, the normal frames of the first code sequence are stored and held (Step S11 in FIG. 3), the normal frames being stored and held are used for interpolation to generate frames that replace invalid frames (Step S12 in FIG. 3), and the codes of the generated frames are decoded to produce a decoded signal (Step S3 in FIG. 3).

Subsequently, the code conversion device encodes the generated signal to generate codes corresponding to invalid frames (Step S14 in FIG. 3), and makes the normal frames of the first code sequence be the frames of the second code sequence without performing their conversion while replacing the codes of the invalid frames with the generated codes to make the result be the frames of the second code sequence (Step S15 in FIG. 3).

Figure 4:
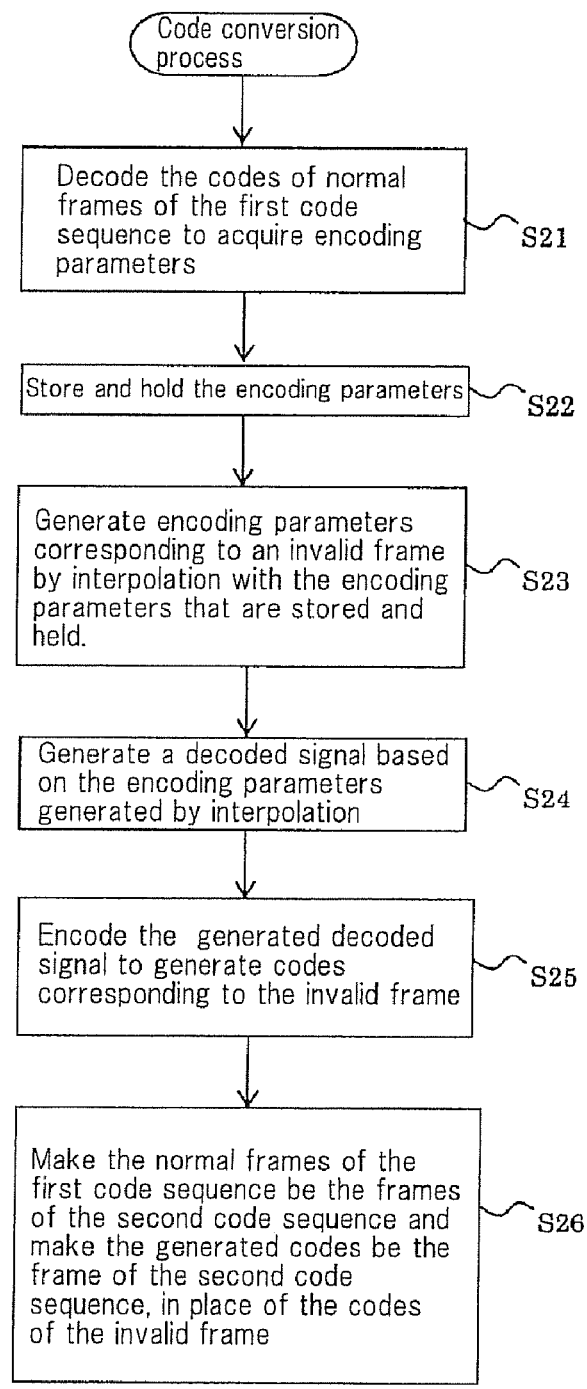
FIG. 4 is a flow chart showing another processing example of a code conversion method according to an exemplary embodiment of the present invention.

FIG. 4 is a flow chart showing another processing example of a code conversion method of an exemplary embodiment of the present invention. Referring to FIG. 4, another example of the process of the code conversion method according to the exemplary embodiment of the present invention will be described. Here, it is assumed that the process shown in FIG. 4 is also carried out in an unillustrated code conversion device.

When the first code sequence is input to the code conversion device, the codes of the normal frames of the first code sequence are decoded to produce encoding parameters (Step S21 in FIG. 4), the encoding parameters are stored and held (Step S22 in FIG. 4), and the encoding parameters being stored and held are used for interpolation to generate encoding parameters corresponding to invalid frames (Step S23 in FIG. 4).

Subsequently, the code conversion device generates a decoded signal using the encoding parameters generated by interpolation (Step S24 in FIG. 4), encodes the generated decoded signal to produce the codes corresponding to invalid frames (Step S25 in FIG. 4), and makes the normal frames of the first code sequence be the frames of the second code sequence without performing their conversion while replacing the codes of the invalid frames with the generated codes to make the result be the frames of the second code sequence (Step S26 in FIG. 4).

In this way, in the exemplary embodiment of the present invention, with regard to codes of invalid frames of the first code sequence, the codes corresponding to the invalid frames are generated by interpolating the signals which are obtained by decoding normal frames and by using the codes which are obtained by encoding the interpolated signals, or the codes corresponding to the invalid frames are generated by interpolating the codes of normal frames and by using the codes which are obtained by encoding and decoding the interpolated codes, or the codes corresponding to the invalid frames are generated by interpolating the encoding parameters which are obtained from normal frames and by using the codes which are obtained by encoding and decoding the interpolated encoding parameters.

Here, in the process shown in FIG. 3, the processes of decoding (Step S13) and encoding (Step S14) may be omitted.

Thus, in the exemplary embodiment of the present invention, it becomes possible to perform code conversion when the first code sequence is invalid such as in the case where there are errors in the codes contained in the first code sequence, in the case where there are some codes lacking and in other cases.

Exemplary Embodiment 1

Figure 5:
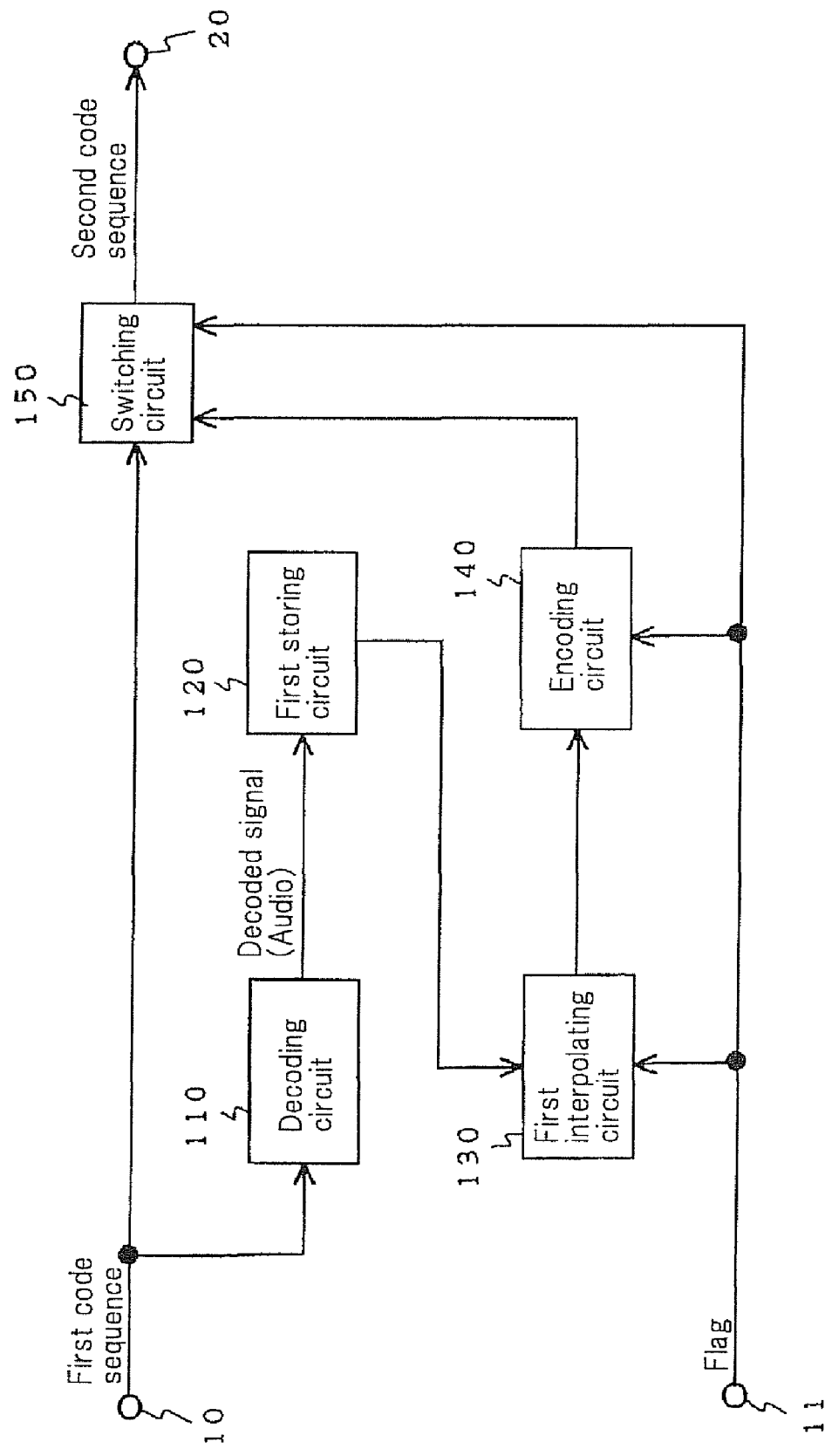
FIG. 5 is a block diagram showing a configuration of a code conversion device according to the first exemplary embodiment of the present invention.

FIG. 5 is a block diagram showing a configuration of a code conversion device according to the first exemplary embodiment of the present invention. In FIG. 5, the code conversion device of the first exemplary embodiment of the present invention includes input terminals 10, 11, output terminal 20, decoding circuit 110, first storing circuit 120, first interpolating circuit 130, encoding circuit 140 and switching device 150.

In the present exemplary embodiment, a specific example of a signal is presumed to be a speech signal. The code sequence is assumed to be processed for every frame that is the processing unit for encoding and decoding. For example, in the case of the AMR (Adaptive Multi-Rate) codec described in the aforementioned non-patented document 2, one frame corresponds to 20 msec. In this case, if the sampling frequency of a speech signal to be encoded is 8000 Hz, one frame of the speech signal consists of 160 samples. The codes for one frame obtained by encoding this are 244 bits when the bit rate is 12.2 kbit/s.

Here, referring to the aforementioned non-patented document 2, of 244 bits of codes for one frame, 38 bits are allotted to LP (Linear Prediction) coefficients. Similarly, bits are also allotted to other encoding parameters such as gains and the like.

As G.711 described in the aforementioned non-patented document 3, in a scheme in which encoding and decoding are performed on every sample of a speech, in most cases a group of codes corresponding to a plurality of samples are transmitted, hence this group of codes can be regarded as one frame. For example, if one frame is equal to 20 msec, the speech signal for one frame includes 160 samples when the sampling frequency is 8000 Hz. The codes for one frame obtained by encoding this are equal to 1280 bits when the bit rate is 64 kbit/s. In this way, the code sequence is assumed to be constructed of codes of multiple frames.

In this exemplary embodiment, when codes that have been obtained by encoding a speech signal based on a certain speech encoding scheme are transmitted, a code sequence that contains frames having invalid codes with bit inversion occurring due to transmission error or the like or a code sequence that has some frames lost or other defects occurring during transmission is regarded as the first code sequence. Here, these undecodable frames are defined as invalid frames. Further, the code sequence that has been obtained by replacing the codes corresponding to the invalid frames with generated codes in the first code sequence is defined as the second code sequence.

In FIG. 5, the same elements or equivalent elements to those of the conventional code conversion device shown in FIG. 1 are allotted with the same reference numerals, and input terminal 10, output terminal 20 and decoding circuit 110 are basically the same as those in FIG. 1 except that the way of making a connection is partly different. Hereinbelow, description of the aforementioned same or equivalent elements is omitted, and the points of difference, specifically, input terminal 11, first storing circuit 120, first interpolating circuit 130, encoding circuit 140 and switching device 150 will be described individually.

First storing circuit 120 stores and holds the decoded speech signal input from decoding circuit 110 and outputs the decoded speech signal which has been stored and held to first interpolating circuit 130. Here, assuming that the decoded speech signal which should be stored and held consists of N frames, if one frame is 20 msec, the decoded speech signal for (N×20) msec will be stored and held in first storing circuit 120.

First interpolating circuit 130, to which a flag via input terminal 11 is applied and to which the decoded speech signal for N frames, which has been stored and held, from first storing circuit 120, generates a speech signal for one frame by interpolation using the decoded speech signal if the flag is "1", and outputs the generated speech signal to encoding circuit 140. First interpolating circuit 130 does not operate when the flag is "0".

Herein, the flag value is set at "1" when the first code sequence for one frame input to decoding circuit 110 via input terminal 10 is invalid due to bit error or the like or when the decoding process cannot be carried out due to lack of frames. Otherwise, the flag value is set at "0". The flag may take other values than "0" and "1" as long as it can distinguish between the above cases.

In order to determine whether a frame is valid or not, there are some methods, including one method that uses information contained in the header of the frame, one method that uses a checksum contained in the transmission protocol that is used to transmit the code sequence in frame units, and other methods. For example, when the speech encoding scheme is the AMR codec described in the aforementioned non-patented document 2, it is possible to determine whether the frame has error codes, based on the value of FQI (Frame Quality Indicator) included in the frame header, hence it is possible to set the flag value to refer to this. Here, description of the frame structure and the details of the header of the frame are found in non-patented document 4 ["AMR Speech Codec Frame Structure" (3GPP TS26.101, 2004-09)].

Also, there are some methods that can be considered to generate a speech signal corresponding to the frame by interpolation when flag is "1" or when a frame in the first code sequence is invalid. As a simple method, it is possible to directly repeat the speech signal for the previous one frame immediately before the subject frame, among the decoded speech signals generated from the past normal frames that have been stored and held.

It is also possible to suppress degradation of speech quality by analyzing the pitch period of the stored and held speech signal for N frames, by selecting the desired signal from the signal of N frames in view of continuity with the frames before and after, and by cuffing out and employing one frame from the selected desired signal. Further, if some frames in a row need to be interpolated, it is possible to suppress degradation of speech quality by gradually attenuating the amplitude of the signal instead of simply repeating the speech signal.

Encoding circuit 140 receives the flag via input terminal 11. When the flag is "1", it receives and encodes the speech signal generated by interpolation from first interpolating circuit 130, and outputs the encoded signal as the codes corresponding to the invalid frame to switching device 150. When the flag is "0", encoding circuit 140 does not operate.

Switching device 150 receives the flag via input terminal 11. When the flag is "0", switching device 150 receives the first code sequence input through input terminal 10 and directly outputs it as the second code sequence from output terminal 20. When the flag is "1", switching device 150 receives the codes output from encoding circuit 140 and outputs them as the second code sequence from output terminal 20.

In this way, in the present exemplary embodiment, as codes of invalid frames of the first code sequence, the codes corresponding to the invalid frames are generated by interpolating with the signals obtained by decoding the normal frames and using the codes obtained by encoding the result, so as to convert the first code sequence into the second code sequence without decoding the invalid frames. Accordingly, it is possible to perform code conversion of even the invalid frames whose codes cannot be converted due to inability to decode the codes, just as in the case where there are errors in the codes contained in the first code sequence, in the case where there are some codes lacking and in other cases.

Exemplary Embodiment 2

Figure 6:
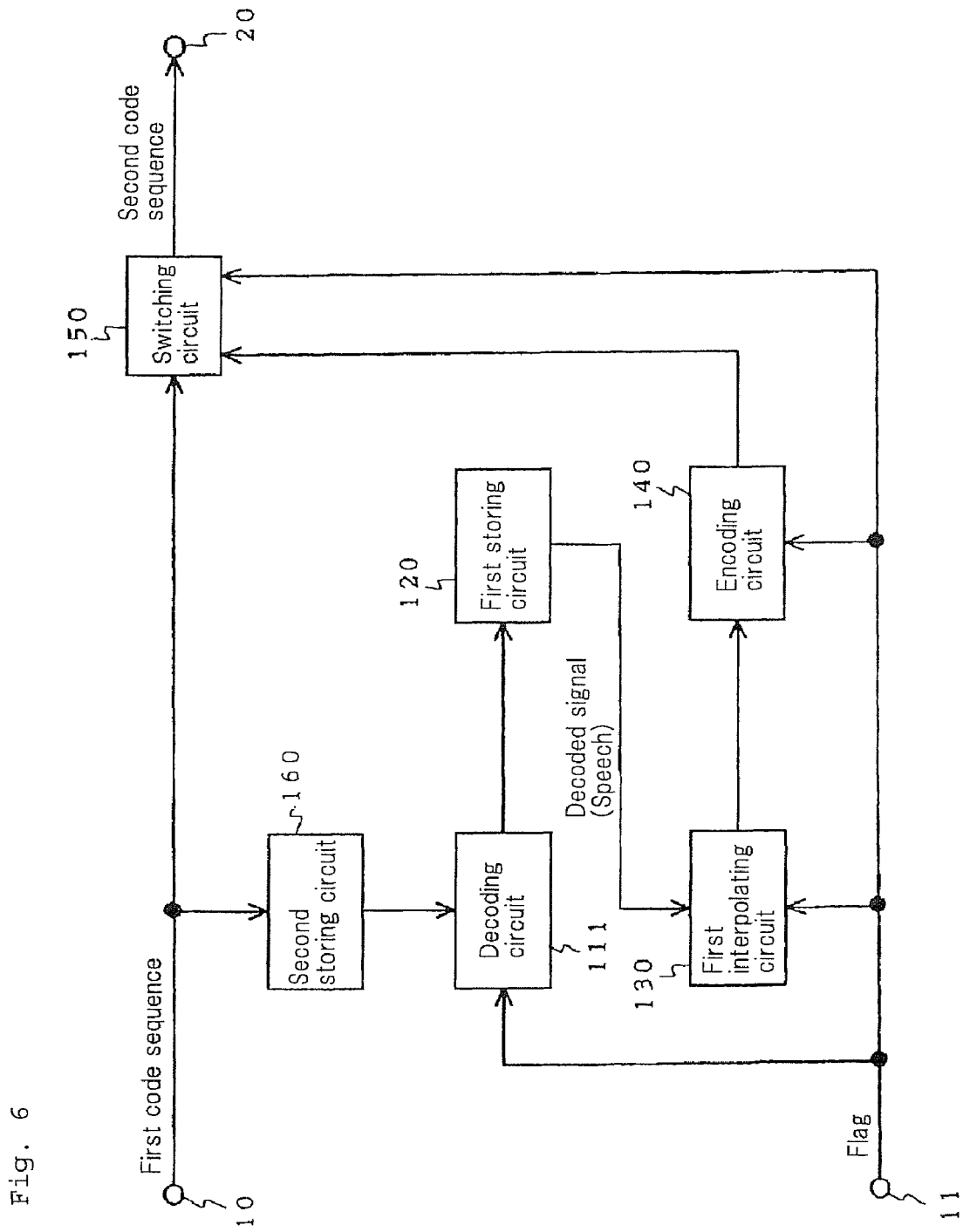
FIG. 6 is a block diagram showing a configuration of a code conversion device according to the second exemplary embodiment of the present invention.

FIG. 6 is a block diagram showing a configuration of a code conversion device according to the second exemplary embodiment of the present invention. In FIG. 6, the code conversion device of the second exemplary embodiment of the present invention includes input terminals 10, 11, output terminal 20, decoding circuit 111, first storing circuit 120, first interpolating circuit 130, encoding circuit 140, switching device 150 and second storing circuit 160.

In FIG. 6, the same elements or equivalent elements to those of the code conversion device of the first exemplary embodiment of the present invention shown in FIG. 5 are allotted with the same reference numerals. That is, in FIG. 6 input terminals 10 and 11, output terminal 20, first storing circuit 120, first interpolating circuit 130, encoding circuit 140 and switching device 150 are basically the same as those of the code conversion device according to the first exemplary embodiment of the present invention shown in FIG. 5 except that the way of making a connection is partly different. Hereinbelow, description of the aforementioned same or equivalent elements is omitted, and the points of difference, specifically, second storing circuit 160 and decoding circuit 111 will be described.

Second storing circuit 160 stores and holds the first code sequence input from input terminal 10 and outputs the stored and held first code sequence to decoding circuit 111. Here, if the first code sequence stored and held in second storing circuit 160 consists of N frames, a speech signal for (N×20) msec will be stored and held in second storing circuit 160, provided that one frame is 20 msec. Second storing circuit 160 stores and holds the normal frames only, and decoding circuit 111 receives these frames to decode.

Decoding circuit 111 receives a flag via input terminal 11. If the flag is "1", decoding circuit 111 receives the first code sequence stored and held in second storing circuit 160 and decodes the speech signal from this by a decoding process. The speech signal which has been decoded, i.e., the decoded speech is output to first storing circuit 120. When the flag is "0", decoding circuit 111 does not operate.

In this way, in the present exemplary embodiment, as the codes of invalid frames of the first code sequence, codes corresponding to the invalid frames are generated by interpolating with the signals obtained by decoding the normal frames and using the codes obtained by encoding the result, so as to convert the first code sequence into the second code sequence without decoding the invalid frames. Accordingly, it is possible to perform code conversion of even the invalid frames whose codes cannot be converted due to inability to decode the codes, just as in the case where there are errors in the codes contained in the first code sequence, in the case where there are some codes lacking and in other cases.

Further, in the present exemplary embodiment, decoding circuit 111 is adapted to operate only when the code sequence needs to be generated, so that it is possible to further reduce the amount of processing.

Exemplary Embodiment 3

Figure 7:
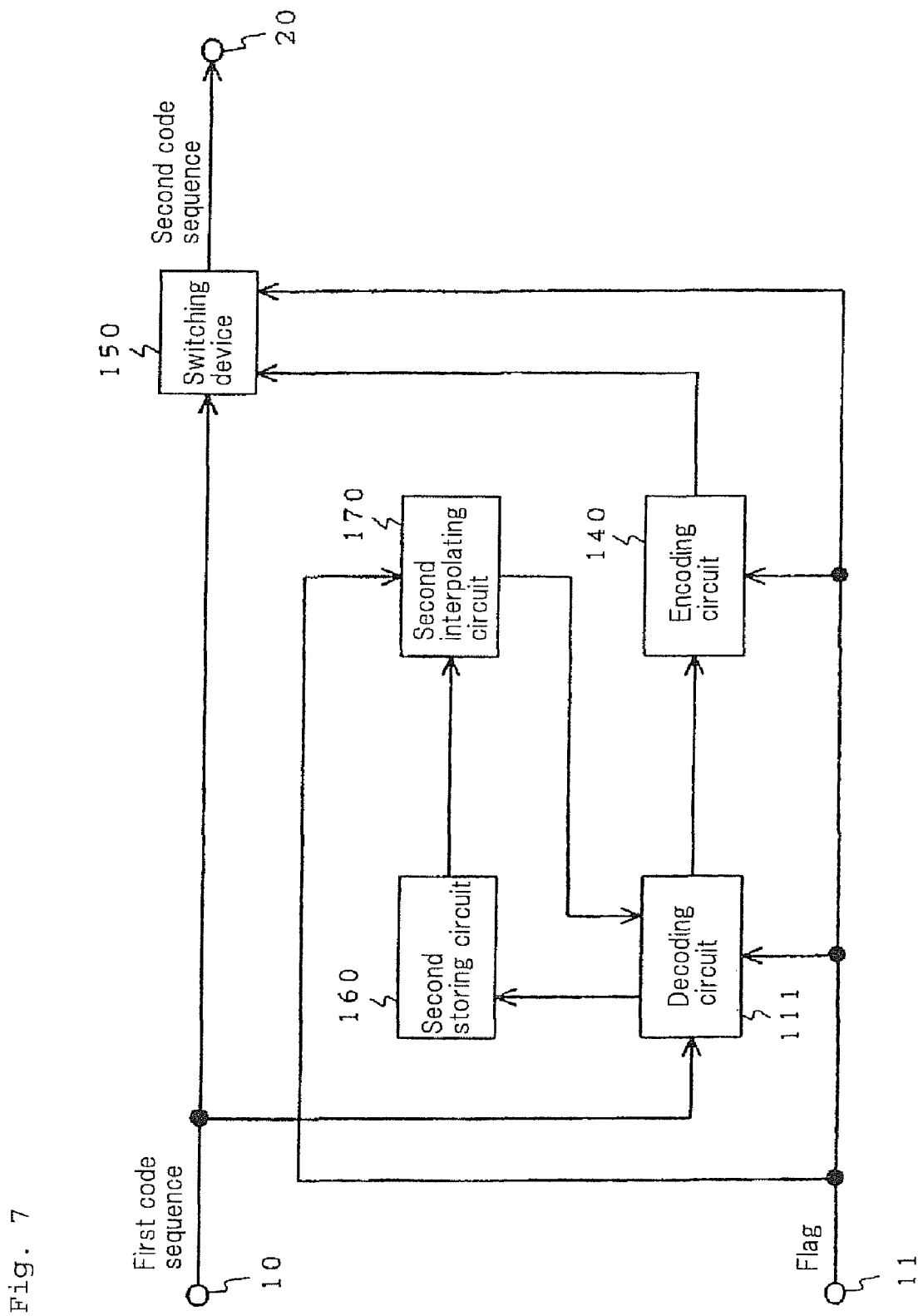
FIG. 7 is a block diagram showing a configuration of a code conversion device according to the third exemplary embodiment of the present invention.

FIG. 7 is a block diagram showing a configuration of a code conversion device according to the third exemplary embodiment of the present invention. In FIG. 7, the code conversion device of the third exemplary embodiment of the present invention includes input terminals 10, 11, output terminal 20, decoding circuit 111, second storing circuit 160, encoding circuit 140, switching device 150 and second interpolating circuit 170.

In FIG. 7, the same elements or equivalent elements to those of the code conversion device of the first exemplary embodiment of the present invention shown in FIG. 5 and the code conversion device of the second exemplary embodiment of the present invention shown in FIG. 6 are allotted with the same reference numerals. Hereinbelow, description of the aforementioned same or equivalent elements is omitted, and the points of difference from the above-described code conversion device of the first exemplary embodiment of the present invention and the code conversion device of the second exemplary embodiment of the present invention shown in FIG. 6, specifically, second interpolating circuit 170 will be described. Here in the present exemplary embodiment, interpolation is performed using the stored and held codes instead of the speech signal.

When receiving a flag via input terminal 11 and the N frames of a first code sequence stored and held in second storing circuit 160, second interpolating circuit 170, if the flag is "1", generates a code sequence for one frame by interpolation using the first code sequence and outputs the generated code sequence to decoding circuit 111. As a simple method, it is possible to directly repeat the code sequence for the previous one frame immediately before the subject frame in the first code sequence that has been stored and held in the past. Second interpolating circuit 170 does not operate when the flag is "0".

Decoding circuit 111 is basically the same as that of the second exemplary embodiment of the present invention described above, but a different way of making a connection is added. Decoding circuit 111 receives the flag from input terminal 11. If the flag is "1", the decoding circuit receives the code sequence for one frame generated by interpolation and output from second interpolating circuit 170, and decodes the speech signal from this by a decoding process of type 1. The speech signal which has been decoded, i.e., the decoded speech is output to encoding circuit 140. When the flag is "0", decoding circuit 111 does not operate.

In this way, in the present exemplary embodiment, the codes corresponding to invalid frames are generated by interpolating with the codes of the normal frames and using the codes obtained by decoding and encoding the result, so as to convert the first code sequence into the second code sequence without decoding invalid frames. Accordingly, it is possible to perform code conversion of even the invalid frames whose codes cannot be converted due to inability to decode the codes, just as in the case where there are errors in the codes contained in the first code sequence, in the case where there are some codes lacking and in other cases.

In the present exemplary embodiment, the decoding and encoding processes may be omitted. In this case, second storing circuit 160 receives the first code sequence via input terminal 10. Second interpolating circuit 170 outputs the code sequence that is generated by interpolation to switching device 150.

Exemplary Embodiment 4

Figure 8:
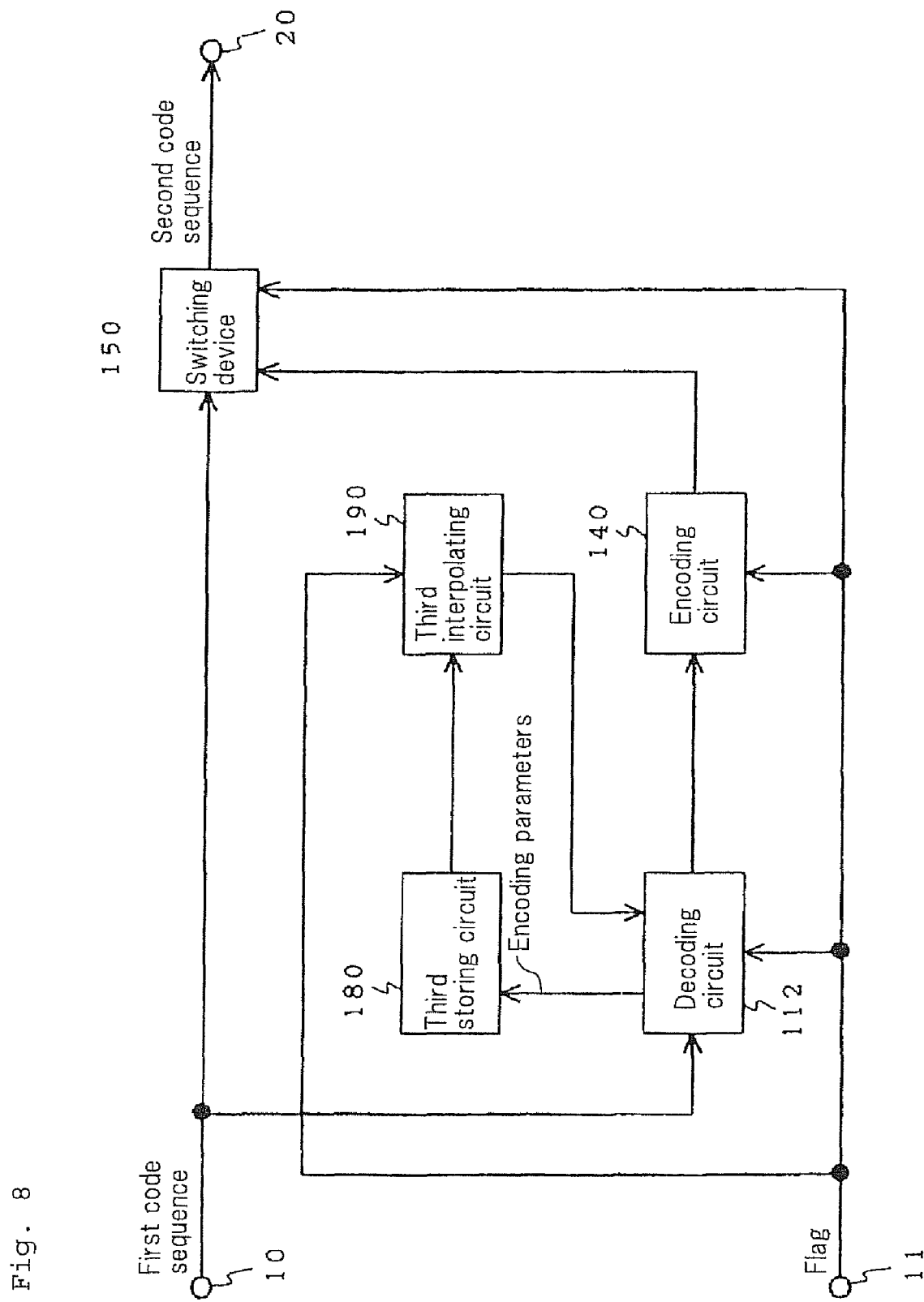
FIG. 8 is a block diagram showing a configuration of a code conversion device according to the fourth exemplary embodiment of the present invention.

FIG. 8 is a block diagram showing a configuration of a code conversion device according to the fourth exemplary embodiment of the present invention. In FIG. 8, the code conversion device of the fourth exemplary embodiment of the present invention includes input terminals 10, 11, output terminal 20, decoding circuit 112, third storing circuit 180, encoding circuit 140, switching device 150 and third interpolating circuit 190.

In FIG. 8, the same elements or equivalent elements to those of the code conversion device of the first exemplary embodiment of the present invention shown in FIG. 5, the code conversion device of the second exemplary embodiment of the present invention shown in FIG. 6, and the code conversion device of the third exemplary embodiment of the present invention shown in FIG. 7 are allotted with the same reference numerals. Hereinbelow, description of the aforementioned same or equivalent elements is omitted, and the points of difference from the above-described configurations, specifically, decoding circuit 112, third storing circuit 180 and third interpolating circuit 190 will be described.

In the present exemplary embodiment, interpolation is carried out using stored and held, encoded parameters. The encoded parameters herein include the aforementioned LP coefficients, ACB (Adaptive Codebook), FCB (Fixed Codebook) gains and the like, which are obtained when the code sequence is decoded by a decoding process, and description of the details of these is found in the aforementioned non-patented document 1 and non-patented document 2.

Decoding circuit 112 acquires encoding parameters from the first code sequence input via input terminal 10 by a decoding process and outputs the acquired encoding parameter to third storing circuit 180. Also, decoding circuit 112 receives a flag from input terminal 11. If the flag is "1", the decoding circuit receives the encoding parameters generated at third interpolating circuit 190, decodes the speech signal from this by a decoding process and outputs the speech signal which has been decoded, i.e., the decoded speech to encoding circuit 140. When the flag is "0", decoding circuit 112 only acquires the encoding parameters but does not need to decode speech.

Third storing circuit 180 stores and holds the encoding parameters input from decoding circuit 112 and outputs the stored and held encoding parameters to third interpolating circuit 190. Here, if the encoding parameters stored and held in third storing circuit 180 consists of N frames, encoding parameters corresponding to the speech signal for (N×20) msec will be stored and held in third storing circuit 180, provided that one frame is 20 msec.

When receiving the flag via input terminal 11 and the encoding parameters for N frames stored and held in third storing circuit 180, third interpolating circuit 190, if the flag is "1", generates encoding parameters for one frame by interpolation using the encoding parameters and outputs the generated encoding parameters to decoding circuit 112. When the flag is "0", third interpolating circuit 190 does not operate.

Here, for interpolation of encoding parameters, as a simple method, it is possible to directly repeat the encoding parameter for the previous one frame immediately before the subject frame in the encoding parameters generated from the codes of the past normal frames that have been stored and held in third storing circuit 180, or it is possible to use the averaged value of the encoding parameters for the past N frames that have been stored and held in third storing circuit 180. Further, if some frames in a row need to be interpolated, it is possible to suppress degradation of speech quality by attenuating the value of the gain that relates to the amplitude of the speech signal, among the encoding parameters.

In this way, in the present exemplary embodiment, the codes corresponding to invalid frames are generated by interpolating with the encoding parameters obtained from normal frames and using the codes obtained by decoding and encoding this, so as to convert the first code sequence into the second code sequence without decoding the invalid frames. Accordingly, it is possible to perform code conversion of even the invalid frames whose codes cannot be converted due to inability to decode the codes, just as in the case where there are errors in the codes contained in the first code sequence, in the case where there are some codes lacking and in other cases.

Exemplary Embodiment 5

Figure 9:
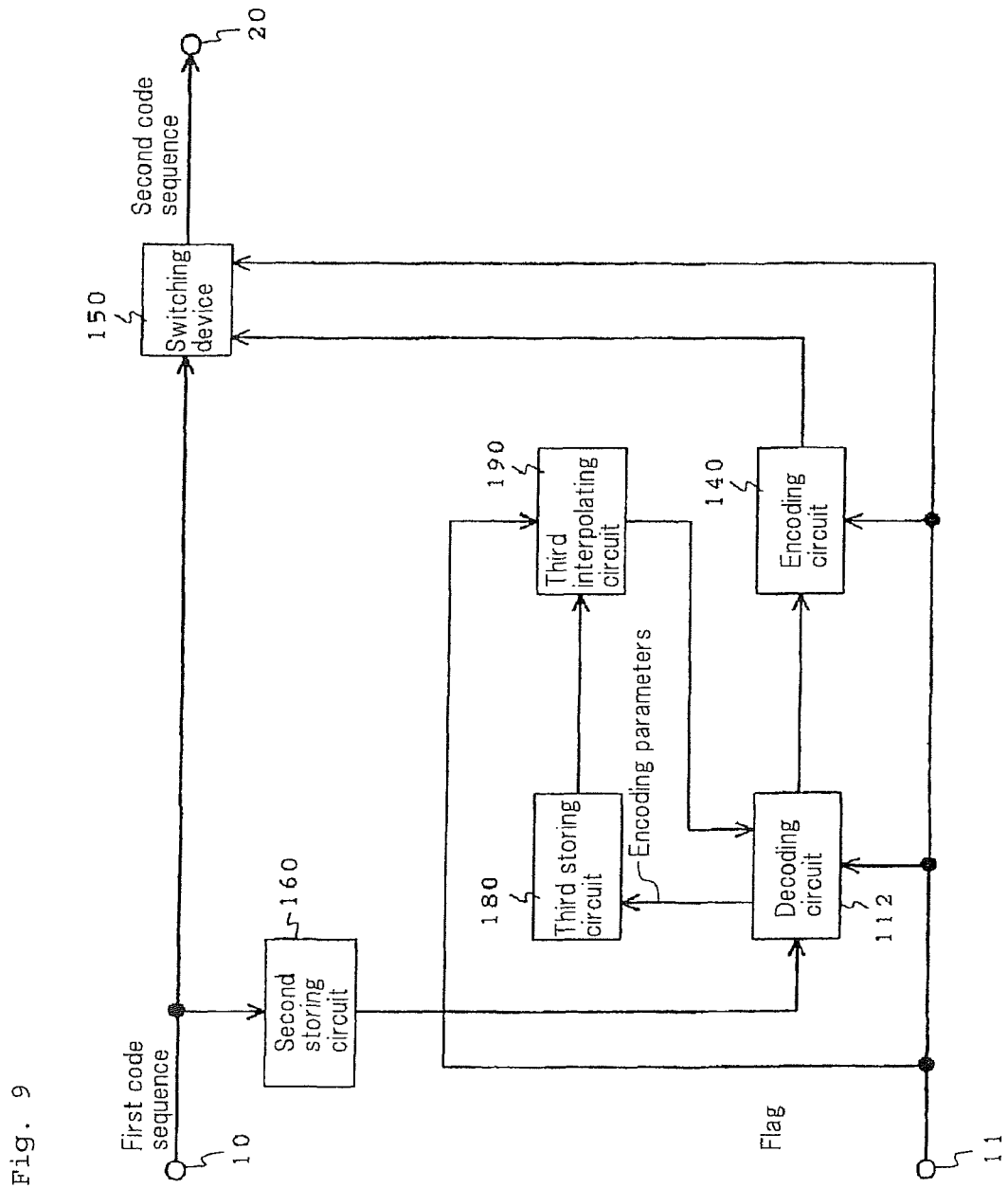
FIG. 9 is a block diagram showing a configuration of a code conversion device according to the fifth exemplary embodiment of the present invention.

FIG. 9 is a block diagram showing a configuration of a code conversion device according to the fifth exemplary embodiment of the present invention. In FIG. 9, the code conversion device of the fifth exemplary embodiment of the present invention includes input terminals 10, 11, output terminal 20, decoding circuit 112, second storing circuit 160, third storing circuit 180, encoding circuit 140, switching device 150 and third interpolating circuit 190.

In FIG. 9, the same elements or equivalent elements to those of the code conversion device of the fourth exemplary embodiment of the present invention shown in FIG. 8 are allotted with the same reference numerals. Hereinbelow, description of the aforementioned same or equivalent elements is omitted, and the points of difference from the above-described configuration, specifically, second storing circuit 160 will be described.

That is, in the present exemplary embodiment, though interpolation is performed using the encoding parameters that have been stored and held, in the same manner as in the above fourth exemplary embodiment of the present invention, decoding circuit 112 receives the first code sequence stored and held in second storing circuit 160 only when the decoded speech for replacing invalid frames needs to be generated, and decodes this by a decoding process to thereby output the obtained the decoded speech to encoding circuit 140.

Second storing circuit 160 stores and holds the first code sequence input from input terminal 10 and outputs the stored and held first code sequence to decoding circuit 112. Here, in the present exemplary embodiment, the first code sequence stored and held in second storing circuit 160 is assumed to consist of N frames, as in the above description of the second exemplary embodiment of the present invention.

Decoding circuit 112 receives a flag via input terminal 11. If the flag is "1", the decoding circuit acquires encoding parameters from the first code sequence input from second storing circuit 160 by a decoding process and outputs the acquired encoding parameters to third storing circuit 180. Thereafter, decoding circuit 112 receives the encoding parameters generated at third interpolating circuit 190 and decodes the speech signal from this by a decoding process and outputs the obtained decoded speech signal to encoding circuit 140. When flag is "0", decoding circuit 112 does not operate.

In this way, in the present exemplary embodiment, codes corresponding to the invalid frames are generated by interpolating with the encoding parameters obtained from valid frames and using the codes obtained by decoding and encoding the result, so as to convert the first code sequence into the second code sequence without decoding the invalid frames. Accordingly, it is possible to perform code conversion of even the invalid frames whose codes cannot be converted due to inability to decode the codes, just as in the case where there are errors in the codes contained in the first code sequence, in the case where there are some codes lacking and in other cases.

Further, in the present exemplary embodiment, decoding circuit 112 is adapted to operate only when the decoded speech for replacing the invalid frame needs to be generated, so that it is possible to further reduce the amount of processing.

Exemplary Embodiment 6

Figure 10:
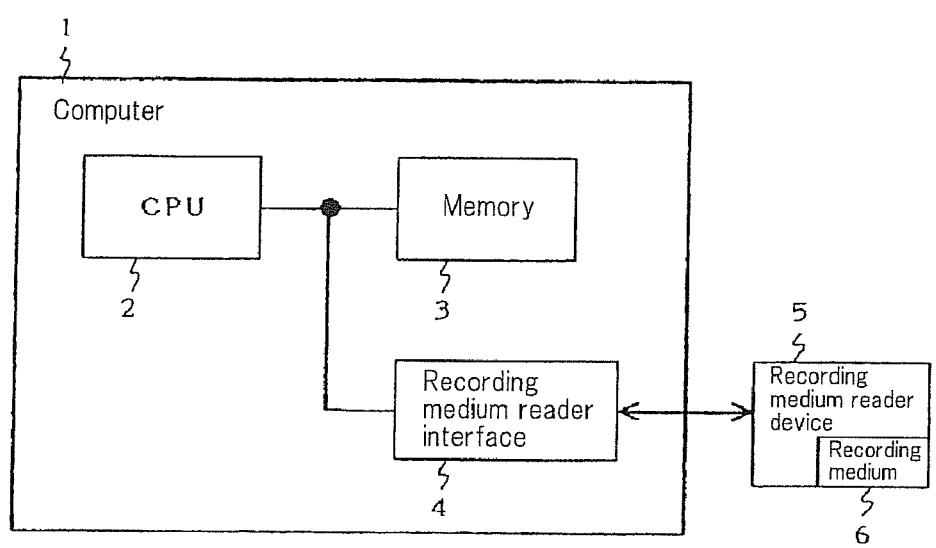
FIG. 10 is a block diagram showing a configuration of a code conversion device according to the sixth exemplary embodiment of the present invention.

The code conversion device of each exemplary embodiment of the present invention described above may be realized by computer control with a digital signal processor and the like. FIG. 10 is a block diagram showing a configuration of a code conversion device according to the sixth exemplary embodiment of the present invention. In FIG. 10, a device configuration for realizing the code conversion process of each of the exemplary embodiments described above is schematically shown.

That is, the code conversion device according to the sixth exemplary embodiment of the present invention is constructed of computer 1, which includes CPU (central processing unit) 2, memory 3 and recording medium reader interface 4. Recording medium reader interface 4 is connected to recording medium reader 5 which reads out programs and the like from recording medium 6.

The programs read out from recording medium 6 are executed by CPU 1, a program for executing the code converting process for converting the first code sequence to the second code sequence is stored in recording medium 6.

This program is a program for executing: (a) a process of generating a decoded signal by decoding codes of normal frames in the first code sequence; (b) a process of storing and holding the decoded signal; (c) a process of generating a signal corresponding to invalid frames by interpolation of the decoded signal that is stored and held; (d) a process of generating codes corresponding to the invalid frames by encoding the generated signal; and (e) a process of employing the normal frames of the first code sequence as frames of the second code sequence without conversion and of substituting the generated codes for the codes of the invalid frame to make a frame of the second code sequence.

Also, the program stored in recording medium 6 may be a program for executing: (a) a process of storing and holding the normal frames of the first code sequence; (b) a process of generating frames which are substituted for invalid frames by interpolation of the normal frames that is stored and held; (c) a process of generating a decoded signal by decoding the codes of the generated frames; (d) a process of generating codes corresponding to the invalid frames by encoding the generated signal; and (e) a process of employing the normal frames of the first code sequence as frames of the second code sequence without conversion and of substituting the generated codes for the codes of the invalid frame to make a frame of the second code sequence.

Further, the program stored in recording medium 6 may be a program for executing: (a) a process of acquiring encoding parameters by decoding the codes of normal frames in the first code sequence; (b) a process of storing and holding the encoding parameters; (c) a process of generating encoding parameters corresponding to invalid frames by interpolation of the encoding parameters stored and held; (d) a process of generating decoded speech using the encoding parameters generated by interpolation; (e) a process of generating codes corresponding to the invalid frames by encoding the generated decoded speech; and (f) a process of employing the normal frames of the first code sequence as frames of the second code sequence without conversion and of substituting the generated codes for the codes of the invalid frame to make a frame of the second code sequence.

Computer 1 loads any one of the above programs from recording medium 6 into memory 3 by way of recording medium reader 5 and recording medium reader interface 4 and executes it by CPU 2.

The above programs may be stored in a non-volatile memory such as a mask ROM (Read Only Memory) etc., flash memory etc. In addition to non-volatile memories, the recording media may include other media such as CD-R (Compact Disc-ROM), FD [Floppy (registered trademark) Disk], DVD (Digital Versatile Disc), magnetic tape (MT: Magnetic Tape), portable-type HDD (Hard Disk Drive) and may also include communication media for carrying the program through wired or wireless communication and the like, such as the case where a program is transmitted through communication media from a server device to a computer and other cases.

Though the above description of each of the exemplary embodiments of the present invention was described referring to code conversion for speech, it is obvious that a similar configuration can be provided for video as well as for speech. That is, the decoding circuit may be replaced by a video decoding circuit and the encoding circuit may be replaced by a video encoding circuit. Here, description of the encoding and decoding methods for video and details of encoding parameters used therein are found in non-patented document ["Video Coding for Low Bit Rate Communication" (ITU-T Recommendation H.263) and in other descriptions of video encoding schemes.

What is claimed is:

1. A code conversion device for converting a first code sequence into a second code sequence, comprising:

a decoding circuit which generates a decoded signal by decoding codes of normal frames of said first code sequence;

a storing circuit which stores and holds the generated decoded signal;

an interpolating circuit which generates a signal corresponding to an invalid frame regarded as an undecodable frame, by interpolation with the decoded signal stored and held in said storing circuit;

an encoding circuit which generates codes corresponding to said invalid frame by encoding the generated signal; and a switching device which employs said normal frames of said first code sequence as frames of the second code sequence without conversion and which substitutes the codes generated by said encoding circuit for the codes of said invalid frame to make a frame of the second code sequence.

2. A code conversion device for converting a first code sequence into a second code sequence, comprising:

a storing circuit which stores and holds codes of normal frames of said first code sequence;

an interpolating circuit which generates codes which are substituted for codes of an invalid frame regarded as an undecodable frame, by interpolation with the codes of said normal frames stored and held in said storing circuit;

a switching device which employs said normal frames of said first code as frames of the second code sequence without conversion and which substitutes the codes generated by said interpolating circuit for the codes of said invalid frame to make a frame of the second code sequence;

a decoding circuit which generates a decoded signal by decoding the codes of the frame generated by said interpolating circuit; and an encoding circuit which generates codes corresponding to said invalid frame by encoding the decoded signal generated by said decoding circuit, wherein said switching device employs said normal frames of said first code as frames of the second code sequence without conversion and substitutes the codes generated by said encoding circuit for the codes of said invalid frame to make a frame of the second code sequence.

3. A code conversion device for converting a first code sequence into a second code sequence, comprising:

a decoding circuit which decodes codes of normal frames of said first code sequence to acquire encoding parameters and generates a decoded signal based on the encoding parameters generated by interpolation;

a storing circuit which stores and holds the encoding parameters acquired by said decoding circuit;

an interpolating circuit which generates, by interpolation with said encoding parameters stored and held in said storing circuit, encoding parameters corresponding to an invalid frame regarded as an undecodable frame;

an encoding circuit which generates codes corresponding to said invalid frame by encoding the decoded signal generated by said decoding circuit; and a switching device which employs said normal frames of said first code as frames of the second code sequence without conversion and substitutes the codes generated by said encoding circuit for the codes of said invalid frame to make a frame of the second code sequence.

4. A code conversion method for use in a code conversion device for converting a first code sequence into a second code sequence, characterized in that said code conversion device executes: a first process of generating a decoded signal by decoding codes of normal frames of said first code sequence; a second process of storing and holding said decoded signal; a third process of generating a signal corresponding to an invalid frame regarded as an undecodable frame, by interpolation with said decoded signal that is stored and held; a fourth process of generating codes corresponding to said invalid frame by encoding the signal generated in the third process; and a fifth process of employing said normal frames of said first code sequence as frames of the second code sequence without conversion and of substituting the codes generated in said fourth process for the codes of said invalid frame to make a frame of the second code sequence.

5. A code conversion method for use in a code conversion device for converting a first code sequence into a second code sequence, characterized in that said code conversion device executes: a first process of storing and holding codes of normal frames of said first code sequence; a second process of generating codes which are substituted for codes of an invalid frame regarded as an undecodable frame, by interpolation with the codes of said normal frames that are stored and held; and a third process of employing said normal frames of said first code sequence as frames of the second code sequence without conversion and of substituting the codes generated in said second process for the codes of said invalid frame to make a frame of the second code sequence, wherein said code conversion device further executes: a fourth process of generating a decoded signal by decoding the codes of the frame generated in the second process; and a fifth process of generating codes corresponding to said invalid frame by encoding the signal generated in said fourth process, and said third process is a process of employing said normal frames of said first code sequence as frames of the second code sequence without conversion and of substituting the codes generated in said fifth process for the codes of said invalid frame to make a frame of the second code sequence.

6. A code conversion method for use in a code conversion device for converting a first code sequence into a second code sequence, characterized in that said code conversion device executes: a first process of decoding codes of normal frames of said first code sequence to acquire encoding parameters; a second process of storing and holding the acquired encoding parameters; a third process of generating, by interpolation with said encoding parameters that are stored and held, encoding parameters corresponding to an invalid frame regarded as an undecodable frame; a fourth process of generating a decoded signal based on the encoding parameters generated by interpolation; a fifth process of generating codes corresponding to said invalid frame by encoding the generated decoded signal; and a sixth process of employing said normal frames of said first code sequence as frames of the second code sequence without conversion and of substituting the codes generated in said fifth process for the codes of said invalid frame to make a frame of the second code sequence.

7. A recording medium recorded with a program for a code conversion method for use in a code conversion device for converting a first code sequence into a second code sequence, said program being for causing a computer to execute: a first process of generating a decoded signal by decoding codes of normal frames of said first code sequence; a second process of storing and holding said decoded signal; a third process of generating a signal corresponding to an invalid frame regarded as an undecodable frame, by interpolation with said decoded signal stored and held in said storing circuit; a fourth process of generating codes corresponding to said invalid frame by encoding the generated signal in the third process; and a fifth process of employing said normal frames of said first code sequence as frames of the second code sequence without conversion and of substituting the codes generated in said fourth process for the codes of said invalid frame to make a frame of the second code sequence.

8. A recording medium recorded with a program for a code conversion method for use in a code conversion device for converting a first code sequence into a second code sequence, said program being for causing a computer to execute: a first process of storing and holding codes of normal frames of said first code sequence; a second process of generating codes which are substituted for codes of an invalid frame regarded as an undecodable frame, by interpolation with the codes of said normal frames that are stored and held; and a third process of employing said normal frames of said first code sequence as frames of the second code sequence without conversion and of substituting the codes generated in said second process for the codes of said invalid frame to make a frame of the second code sequence, wherein the computer is caused to further execute: a fourth process of generating a decoded signal by decoding the codes of the frame generated in the second process; and a fifth process of generating codes corresponding to said invalid frame by encoding the signal generated in said fourth process, and said third process is a process of employing said normal frames of said first code sequence as frames of the second code sequence without conversion and of substituting the codes generated in said fifth process for the codes of said invalid frame to make a frame of the second code sequence.

9. A recording medium recorded with a program for a code conversion method for use in a code conversion device for converting a first code sequence into a second code sequence, said program being for causing a computer to execute: a first process of decoding codes of normal frames of said first code sequence to acquire encoding parameters; a second process of storing and holding the acquired encoding parameters; a third process of generating, by interpolation with said encoding parameters that are stored and held, encoding parameters corresponding to an invalid frame regarded as an undecodable frame; a fourth process of generating a decoded signal based on the encoding parameters generated by interpolation; a fifth process of generating codes corresponding to said invalid frame by encoding the generated decoded signal; and a sixth process of employing said normal frames of said first code sequence as frames of the second code sequence without conversion and of substituting the codes generated in said fifth process for the codes of said invalid frame to make a frame of the second code sequence.

* * * * *